United States Patent
Park et al.

(10) Patent No.: US 10,436,456 B2
(45) Date of Patent: Oct. 8, 2019

(54) AIR CONDITIONER AND METHOD FOR CONTROLLING AN AIR CONDITIONER

(71) Applicant: LG ELECTRONICS INC., Seoul (KR)

(72) Inventors: Beungyong Park, Seoul (KR); Sungmok Hwang, Seoul (KR); Juyoun Lee, Seoul (KR); Jusu Kim, Seoul (KR); Seaunglok Ham, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 193 days.

(21) Appl. No.: 15/345,580

(22) Filed: Nov. 8, 2016

(65) Prior Publication Data

US 2017/0159957 A1 Jun. 8, 2017

(30) Foreign Application Priority Data

Dec. 4, 2015 (KR) .................. 10-2015-0172079

(51) Int. Cl.
*F24F 11/00* (2018.01)
*G06K 9/52* (2006.01)
(Continued)

(52) U.S. Cl.
CPC .......... *F24F 1/0014* (2013.01); *F24F 1/0047* (2019.02); *F24F 11/30* (2018.01);
(Continued)

(58) Field of Classification Search
CPC ........ F24F 11/0034; F24F 11/83; F24F 11/77; F24F 2011/0035; F24F 2011/0063;
(Continued)

(56) References Cited

U.S. PATENT DOCUMENTS 7,330,568 B2 * 2/2008 Nagaoka .................. B60R 1/00
                                                              382/103
9,280,560 B1 * 3/2016 Dube .................. G06K 9/00523
(Continued)

FOREIGN PATENT DOCUMENTS

CN        104514736        * 4/2015          ............. F04D 25/08
JP        2008-261567        10/2008
(Continued)

OTHER PUBLICATIONS

Yasushi et al, "Air conditioner", WO 2011/043038 Machine Translation, Apr. 14, 2011, pp. 31. (Year: 2011).*
(Continued)

*Primary Examiner* — Brian W Wathen
*Assistant Examiner* — Olvin Lopez Alvarez
(74) *Attorney, Agent, or Firm* — Ked & Associates LLP

(57) ABSTRACT

An air conditioner and a method for controlling an air conditioner are provided. The method may include acquiring a top view image for an indoor space using an imaging device and calculating a height of a ceiling in which an indoor device may be mounted; determining whether an image is a human body or an obstacle, with respect to at least one image included in the to view image; and performing control of the indoor device to allow air flow to avoid an obstacle and be discharged toward a human body by controlling driving of an indoor fan or one or more discharge vane provided in the indoor device.

11 Claims, 12 Drawing Sheets

(51) Int. Cl.

| | |
|---|---|
| *G01B 11/06* | (2006.01) |
| *G06T 7/00* | (2017.01) |
| *F24F 1/0014* | (2019.01) |
| *F24F 1/0047* | (2019.01) |
| *G06K 9/62* | (2006.01) |
| *G06T 15/20* | (2011.01) |
| *H04N 17/00* | (2006.01) |
| *F24F 11/30* | (2018.01) |
| *F24F 11/79* | (2018.01) |
| *F24F 11/77* | (2018.01) |
| *F24F 11/83* | (2018.01) |
| *G06K 9/00* | (2006.01) |
| *F24F 120/10* | (2018.01) |
| *F24F 120/12* | (2018.01) |
| *F24F 11/64* | (2018.01) |

(52) U.S. Cl.
CPC ............. *F24F 11/77* (2018.01); *F24F 11/79* (2018.01); *F24F 11/83* (2018.01); *G01B 11/0608* (2013.01); *G06K 9/52* (2013.01); *G06K 9/6267* (2013.01); *G06T 15/20* (2013.01); *H04N 17/002* (2013.01); *F24F 11/64* (2018.01); *F24F 2120/10* (2018.01); *F24F 2120/12* (2018.01); *G06K 9/00362* (2013.01)

(58) Field of Classification Search
CPC ...... F24F 11/30; F24F 1/0014; F24F 11/0078; F24F 11/79; F24F 2001/0037; F24F 2120/10; F24F 2120/12; F24F 11/64; G06K 9/52; G06K 9/6267; G06K 9/00362; G06T 7/004; G06T 15/20; H04N 17/002; G01B 11/0608; G06F 3/00; Y02B 30/746
USPC ........................................................ 700/276
See application file for complete search history.

(56) References Cited

U.S. PATENT DOCUMENTS

| | | | | |
|---|---|---|---|---|
| 9,451,810 | B2 * | 9/2016 | Regan ..................... | G06T 7/74 |
| 2005/0089198 | A1 * | 4/2005 | Ono ..................... | G06K 9/00255 |
| | | | | 382/115 |
| 2006/0115156 | A1 * | 6/2006 | Nakajima ........... | G06K 9/00362 |
| | | | | 382/190 |
| 2010/0220922 | A1 * | 9/2010 | Okada ................ | G06K 9/00375 |
| | | | | 382/159 |
| 2011/0001799 | A1 * | 1/2011 | Rothenberger .... | G06K 9/00771 |
| | | | | 348/47 |
| 2011/0129154 | A1 * | 6/2011 | Shimodaira ............... | G06T 7/80 |
| | | | | 382/190 |
| 2011/0173204 | A1 * | 7/2011 | Murillo .................... | G06F 3/017 |
| | | | | 707/741 |
| 2011/0205371 | A1 | 8/2011 | Nagata et al. | |
| 2011/0206439 | A1 * | 8/2011 | Takahashi ............ | B65H 19/126 |
| | | | | 400/611 |
| 2014/0040835 | A1 * | 2/2014 | Hildreth .................. | G06F 3/017 |
| | | | | 715/863 |
| 2014/0112578 | A1 * | 4/2014 | Wang .................... | A61B 8/0866 |
| | | | | 382/165 |
| 2015/0256815 | A1 * | 9/2015 | Grafulla-Gonzalez ..................... | |
| | | | | G06T 17/00 |
| | | | | 348/46 |
| 2015/0338123 | A1 * | 11/2015 | Iwano ..................... | F24F 13/20 |
| | | | | 454/301 |
| 2015/0371520 | A1 * | 12/2015 | DeLean ............. | G08B 21/0415 |
| | | | | 382/103 |
| 2017/0177976 | A1 * | 6/2017 | Dube .................. | G06K 9/00523 |
| 2017/0243374 | A1 * | 8/2017 | Matsuzawa ............... | G06T 7/80 |

FOREIGN PATENT DOCUMENTS

| | | | | |
|---|---|---|---|---|
| JP | 2011-118553 | | 6/2011 | |
| JP | 2012-102924 | | 5/2012 | |
| JP | 2013-250026 | | 12/2013 | |
| JP | 2015-004476 | | 1/2015 | |
| KR | 1020090087364 | * | 2/2009 | ............. F24F 11/02 |
| KR | 10-2009-0115586 | | 11/2009 | |
| KR | 10-2011-0097589 | | 8/2011 | |
| KR | 10-2012-0018519 | | 3/2012 | |
| KR | 10-1371869 | | 3/2014 | |
| WO | WO 2011/043038 | | 4/2011 | |

OTHER PUBLICATIONS

Kurachi et al, "Air conditioner", JP 20154476 Machine Translation, Jan. 8, 2015, pp. 11. (Year: 2015).*

Escalera et al, "Automatic Chessboard Detection for Intrinsic and Extrinsic Camera Parameter Calibration", Mar. 15, 2010, pp. 2027-2044. (Year: 2010).*

Waldherr et al, "A Gesture Based Interface for Human-Robot Interaction", 2000, pp. 151-173. (Year: 2000).*

Boheme et al, "Neural Networks for Gesture-based remote Control of a Mobile Robot", 1998, pp. 372-377. (Year: 1998).*

Park et al, "Air Conditioner and Controlling Method Thereof, KR20090087364A" Machine Translation, Aug. 17, 2009 , pp. 10. (Year: 2009).*

Park et al, "Air Conditioner. A.ND Contr.Oujng Method Thereof" KR20090115586 Machine Translation, Nov. 5, 2011, pp. 11. (Year: 2011).*

Hirosaki et al, "Air Consitioner" JP 2013250026 Machine Translation, Dec. 12, 2013, pp. 32 (Year: 2013).*

European Search Report dated Apr. 10, 2017 issued in Application No. 16197723.6, pp. 8.

* cited by examiner

AIR CONDITIONER AND METHOD FOR CONTROLLING AN AIR CONDITIONER

CROSS-REFERENCE TO RELATED APPLICATION(S)

The present application claims priority under 35 U.S.C. 119 and 35 U.S.C. 365 to Korean Patent Application No. 10-2015-0172079, filed in Korea on Dec. 4, 2015, which is hereby incorporated by reference in its entirety.

BACKGROUND

1. Field

An air conditioner and a method for controlling an conditioner are disclosed herein.

2. Background

Air conditioners are electronic appliances that maintain air in a predetermined space in a most suitable state according to uses and purposes. Generally, an air conditioner includes a compressor, a refrigerant, an expansion device, and an evaporator, and drives a refrigeration cycle in which compression, condensation, expansion, and evaporation processes of a refrigerant are performed to cool or heat the predetermined space.

The predetermined space may be various spaces depending on a place in which the air conditioner is to be used. For example, when the air conditioner is located in a home or office, the predetermined space may be an indoor space of a house or building.

When the air conditioner performs an air cooling operation, an outdoor heat exchanger included in an outdoor unit or device functions as a refrigerant and an indoor heat exchanger included in an indoor unit or device functions as an evaporator. On the other hand, when the air conditioner performs an air heating operation, the indoor heat exchanger functions as a refrigerant and the outdoor heat exchanger functions as an evaporator.

The air conditioner needs to operate according to appropriate operation methods so as to make a user feel comfortable, for example, not too hot or too cold. In the related art, there has been suggested technology to identify a motion content of an occupant and control an operation of the air conditioner. One related art document is Korean Publication No. 10-2011-0097589, published on Aug. 31, 2011 and entitled "Image Processing Apparatus, Image Processing Method, and Air Conditioner Control Apparatus", which is hereby incorporated by reference.

The above related art document discloses technology in which an image processing apparatus is provided, differential image information according to a motion of an occupant is accumulated and a motion content of the occupant is identified based on the accumulated differential image information. However, according to the related art, there is a problem in that it is difficult to apply the technology to a ceiling type indoor unit or device as front image information of the indoor unit is acquired at a height at which the user is located.

Further, in the indoor space in which the air conditioner is mounted, for example, in a living space or an office space, there is also an obstacle, such as a wall, defining a space or furniture in addition to the user. When air flow discharged from the air conditioner is blocked by the obstacle, there occurs a problem that the discharged air flow is hardly delivered to the user. The above related art has limitations in solving this problem.

Furthermore, an indoor unit or device of the air conditioner may be configured as a ceiling type indoor unit or device mounted in the ceiling. Moreover, heights of the ceiling are different depending on a size of the indoor space, and therefore, mounting heights of the ceiling type indoor unit are different. When the mounting height is too high, the discharged air flow is not appropriately delivered to the user and when the mounting height is too low, the discharged air flow is directly delivered to the user, causing the user to feel uncomfortable. The above-described related art has limitations in solving this problem.

BRIEF DESCRIPTION OF THE DRAWINGS

Embodiments will be described in detail with reference to the following drawings in which like reference numerals refer to like elements, and wherein.

DETAILED DESCRIPTION

Hereinafter, specific embodiments will be described with reference to accompanying drawings. It will be understood that the description herein is not intended to limit the claims to the specific embodiments described. On the contrary, it is intended to cover alternatives, modifications, and equivalents as may be included within the spirit and scope of the present disclosure as defined by the appended claims.

Figure 1:
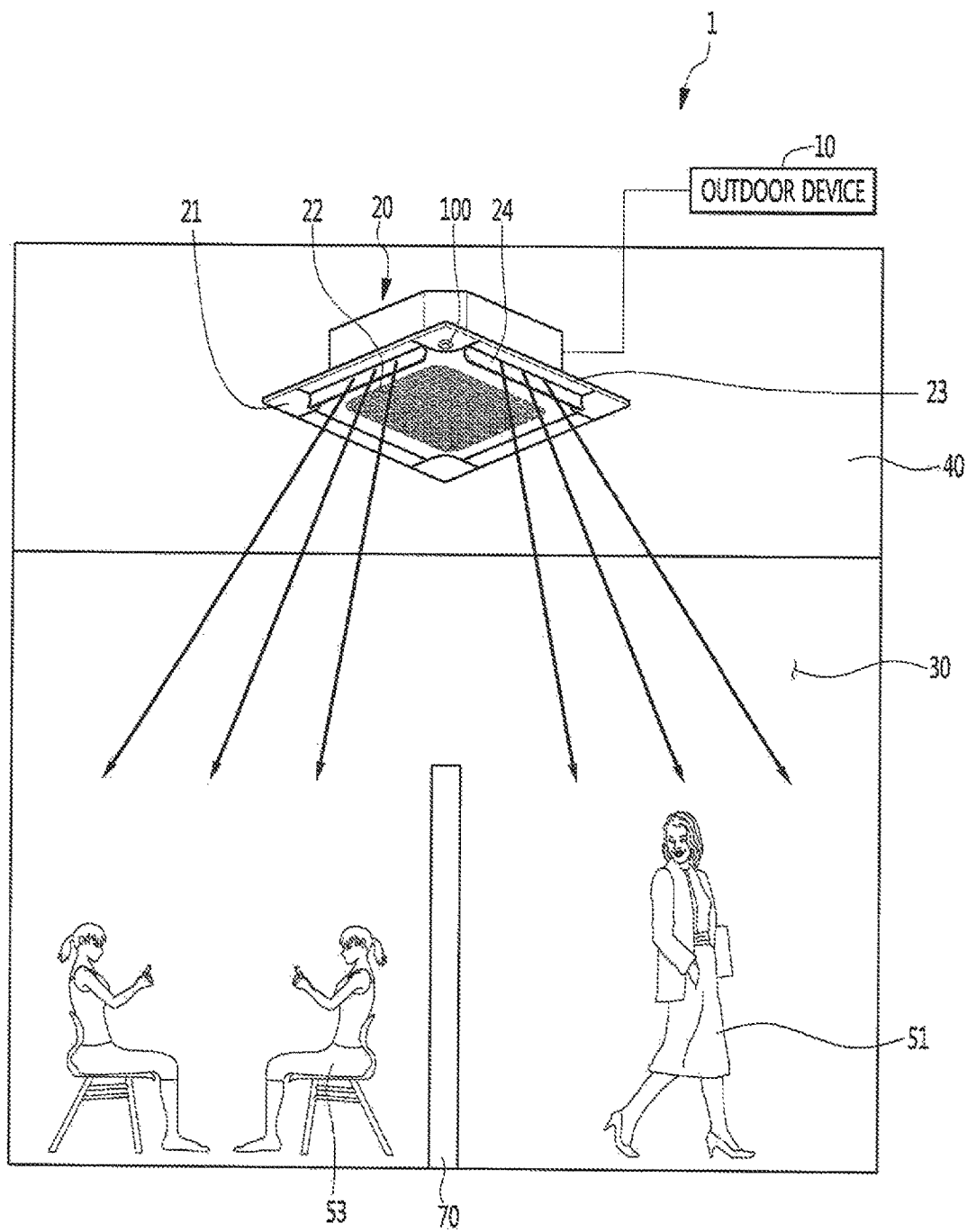
FIG. 1 illustrates a state in which an indoor unit or device is mounted on a ceiling in an indoor space and air flow is discharged therefrom according to an embodiment.
Figure 2:
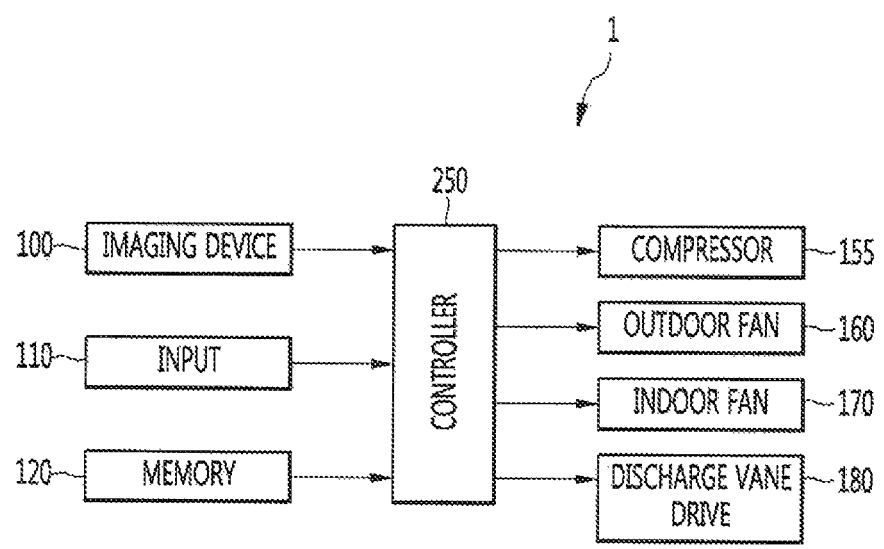
FIG. 2 is a block diagram of an air conditioner according to an embodiment.

FIG. 1 illustrates a state in which an indoor unit or device mounted in a ceiling in an indoor space and air flow is discharged therefrom according to an embodiment. FIG. 2 is a block diagram of an air conditioner according to an embodiment.

Referring to FIGS. 1 and 2, the air conditioner 1 according to, an embodiment may include an indoor unit or device 20 mounted in an indoor space 30 in which a user lives or works, for example. The indoor device 20 is an element of the air conditioner 1 and may be operatively connected to an outdoor unit or device 10. The outdoor device 10 may be mounted outside of the indoor space 30, for example, outside of a building and may include a compressor 155 and an outdoor fan 160.

The indoor device 20 may include a ceiling indoor unit or device mounted in a ceiling 40 of the indoor space 30. The ceiling indoor device may be configured to discharge air flow downward from the ceiling 40.

The indoor device 20 may include a front panel 21 that defines a bottom surface of the indoor device 20, one or more suction portion or inlet 22 formed in the front panel 21 to suction air into the indoor space 30, and one or more discharge portion or outlet 23 through which heat-exchanged air may be discharged.

The indoor device 20 may be provided with an indoor heat exchanger and an indoor fan 170 that generates an air flow. Also, the indoor device 20 may further include one or more discharge vane 24 movably provided in or at one side of the one or more discharge outlet 23 to adjust an air volume or discharge direction of air flow discharged from the discharge outlet 23. For example, the discharge vane 24 may be rotatably provided in or at one side of the discharge outlet 23.

The air conditioner 1 may further include a discharge vane driving unit or device 180 that provides a drive power to the one or more discharge vane 24. Due to the discharge vane drive 180, an opening degree of the discharge outlet 23 may be increased or decreased. The discharge vane drive 180 may include an actuator.

For example, when a number of rotations of the indoor fan 170 is high or an opening degree of the discharge vane 24 is increased, a volume of air discharged from the indoor device 20 may increase. On the other hand, when the number of rotations of the indoor fan 170 is low or the opening degree of the discharge vane 24 decreases, the volume of air discharged from the indoor device 20 may decrease. When the discharge vane 24 is moved, the direction of the air flow discharged from the discharge vane 24 may be controlled.

The air conditioner 1 may further include an imaging device 100 configured to acquire an image of the indoor space 30. For example, the imaging device 100 may be, mounted in the front panel 21 and arranged directed toward the indoor space 30. As another example, the imaging device 100 may be mounted in a portion of the ceiling 40 adjacent to the indoor device 20.

For example the imaging device 100 may include a camera capable of capturing an image of a human body or an obstacle. As another example, the imaging device 100 may include a vision sensor. The vision sensor may be a sensor capable of acquiring an image of a predetermined object existing or disposed in the indoor space 30.

The image acquired by the imaging device 100 may be compared with a previously-stored image and it may be determined whether the object is a person (human body) or an obstacle. More specifically, in FIG. 1, a plurality of people 51 and 53 and an obstacle 70 may be positioned in the indoor space 30. The plurality of people 51 and 53 may include a standing person 51 and a sitting person 53.

The obstacle may include furniture, such as a desk or a chair, a partition wall, or an article, such as a pot. The article may be referred to as an obstacle as the article disturbs an air flow supplied to a person.

The image recognized through the imaging device 100 may be compared with a reference image stored in a memory 120. A controller 250 may perform the comparison. The reference image may include image data for a standing person or a sitting person. The reference image may include image data corresponding to a plurality of directions in which a person looks. The reference image may include image data about obstacles.

The air conditioner 1 may include an input unit or input 110 configured to allow a user to input an operation instruction for the air conditioner 1. For example, the input 110 may be provided in a remote control.

The input 110 may include a power input unit or input, an operation execution input unit or input, or a ceiling height calculation mode input unit or input. For example, the user may manipulate the power input to turn on or off a power supply of the air conditioner 1 and manipulate the operation execution input to give an instruction for an air cooling operation or an air heating operation.

After the indoor device 20 is mounted in the ceiling 40, the ceiling height calculation mode input may be manipulated to calculate a height of the ceiling 40. When the ceiling height calculation mode is input, an image for a pattern board 150 (see FIG. 3) placed on a bottom surface 45 of the indoor space 30 may be acquired and a ceiling height may be calculated by a predetermined calculation equation. Details related thereto will be described below with reference to the drawings.

Figure 3A:
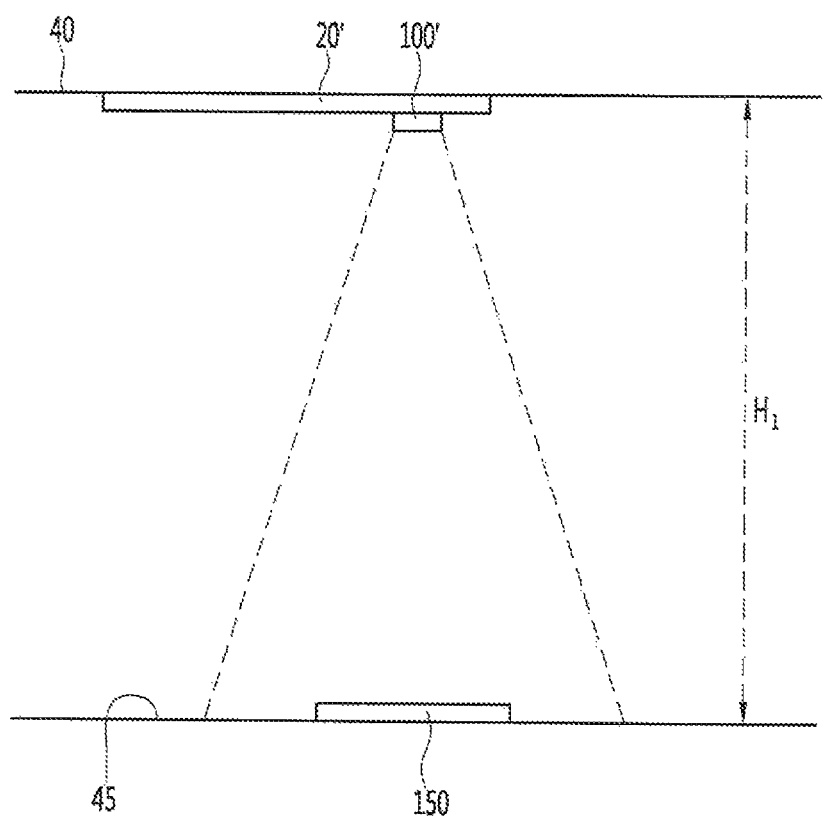
FIGS. 3A and 3B are diagrams illustrating a case in which a pattern board image for a reference height is acquired in order to calculate a ceiling height of the indoor space according to an embodiment.
Figure 3B:
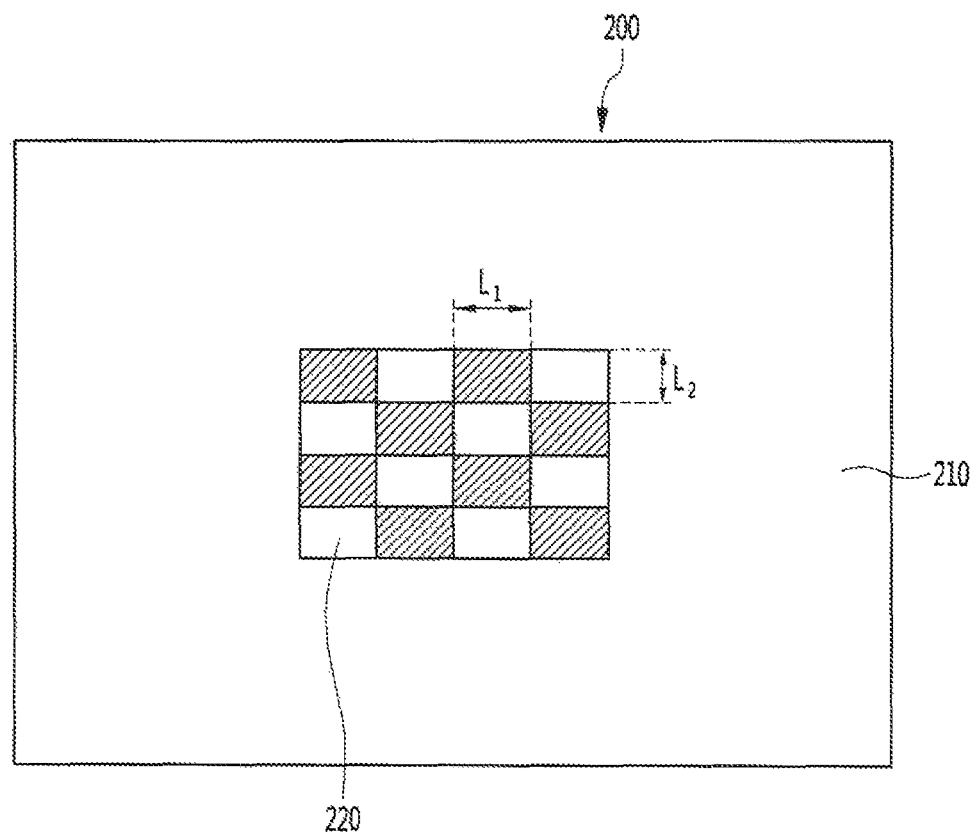
Figure 4A:
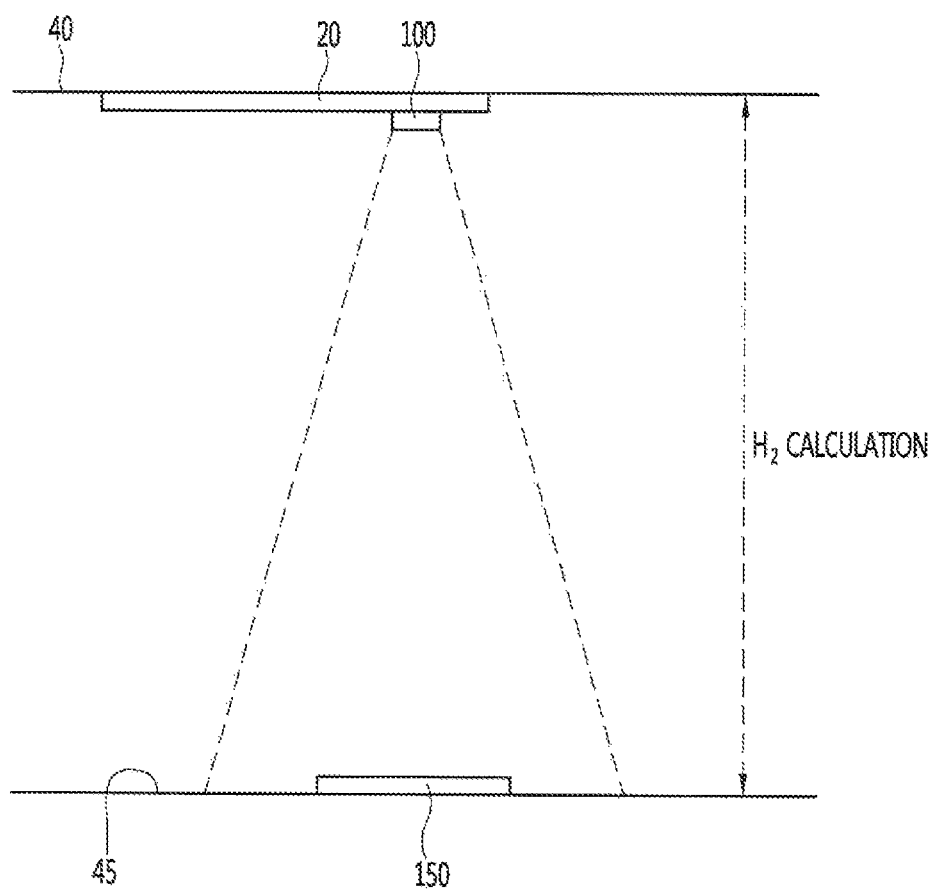
FIGS. 4A and 4B are diagrams illustrating a case n which a pattern board image is acquired using an imaging device of an indoor unit or device, in order to calculate a ceiling height of an indoor space according to an embodiment.
Figure 4B:
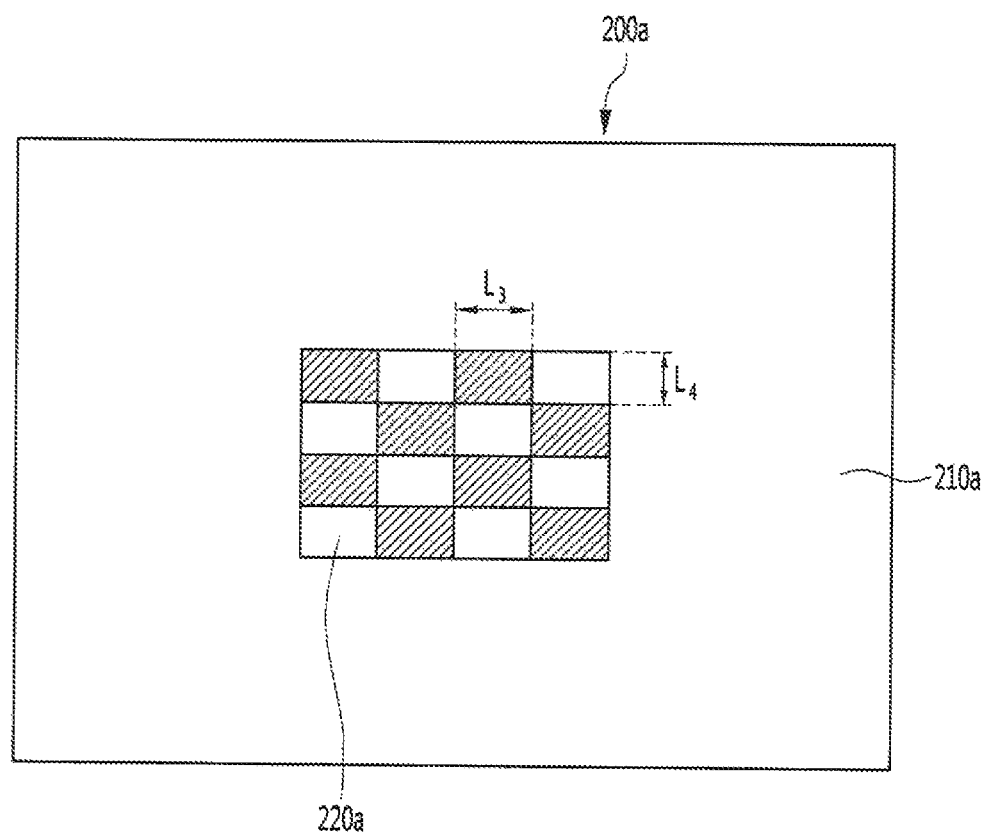

FIGS. 3A and 3B are diagrams illustrating a case in which a pattern board image for a reference height is acquired in order to calculate a ceiling height of an indoor space according to an embodiment. FIGS. 4A and 4B are diagrams illustrating a case in which a pattern board image is acquired using an imaging device of an indoor unit or device, in order to calculate a ceiling height of an indoor space according to an embodiment. The memory 120 according to an embodiment may store a pattern board image (hereinafter, referred to as "a reference imager") used for a reference height $H_1$ in order to calculate a mounting height of the indoor device 20.

FIGS. 3A and 3B illustrate a process of acquiring the reference image. More specifically, the reference height $H_1$ at which a reference indoor device 20' is mounted may be input through the input 110. The pattern board 150 on which a predetermined pattern may be drawn may be placed on the bottom surface 45 of the indoor space 30, and the bottom surface 45 including the pattern board 150 may be photographed using the imaging device 100'.

For example the pattern board 150 may include a chess board in which white boxes and black boxes are arranged alternately. Information about an actual size, of the pattern drawn on the pattern board 150 may be previously stored in the memory 120.

FIG. 3B illustrates an image 200 acquired by the photographing process. The image 200 may include a bottom surface image 210 including a pattern board image 220.

The pattern board image 220 is a reference image. For example, the pattern board image 220 may be formed of squares, each having a horizontal length of $L_1$ and a vertical length of $L_2$ forming the black or white box. In addition, two dimensional coordinates of the pattern board image 220 may be calculated. In a case of setting, as a zero point, a point from which an imaginary line may be drawn straight downward from the imaging device 100, a coordinate value for a position at which the pattern board 150 is placed may be calculated.

A plurality of pattern board images 220 may be acquired for various positions (or angles) of the pattern board 150, with respect to the imaging device 100. It is natural that a shape and size of the pattern board image 220 may vary depending on a position of the pattern board 150. The position and size of the pattern board image 220 may be mapped to the reference height $H_1$ and may be stored in the memory 120.

FIGS. 4A and 4B illustrate a process of calculating a height of the mounted indoor device 20 through camera calibration, which is an image processing technology, after an outdoor device 10 and an indoor device 20 are mounted, according to an embodiment. The air conditioner 1 may include the memory 120 in which the reference image acquired by the process of FIGS. 3A and 3B is stored.

The camera calibration may be understood as a process of finding out a conversion relationship between three dimensional spatial coordinates of the indoor space 30 and two dimensional image coordinates acquired from the imaging device 100, or parameters describing the conversion relationship. The parameters may include an external parameter related with a geometric relationship between the imaging device 100 and an external space, such as a mounting height or a direction in which the imaging device 100 faces, and an internal parameter of the imaging device 100 itself, such as a focus distance or a central point of the imaging device 100.

The external parameter may be a parameter describing the conversion relationship between the coordinate system of the imaging device 100 and the coordinate system of the indoor space 30 and may be expressed as a rotation and translation conversion between the two coordinate systems. As the external parameter is not a unique parameter of the imaging device 100, the external parameter may be changed depending on in which direction or at which position the imaging device is faced or mounted.

In order to acquire the external parameter, first, a unique internal parameter of the imaging device may be calculated using a calibration tool. By calculating the internal parameter, distortion of an image which is caused in the imaging device 100 itself may be corrected.

Next, a calculation may be performed using a known reference image, that is, matching information between actual coordinates of the indoor space 30, the image coordinates of the imaging device 100, and coordinates of an image which is actually captured.

For example, as the calibration tool related with this embodiment, GML C++ Camera Calibration Toolbox may be used. The internal parameter of the imaging device may be measured using the tool. For reference, as this too well known, a specific description thereof has been omitted.

The ceiling height may be calculated by matching the coordinates of the reference image acquired through the process of FIGS. 3A and 3B with the coordinates of an actual image acquired using the imaging device 100 after the indoor device 20 is actually mounted as illustrated in FIGS. 4A and 4B.

More specifically, in a state in which the indoor device 20 is mounted, the ceiling height calculation mode may be performed through the input 110. When the ceiling height calculation mode is performed, the bottom surface 45 on which, the pattern board 150 is placed may be photographed using the imaging device 100.

When the photographing is performed, an image 200a may be generated. The image 200a may include a bottom surface image 210a including a pattern board image 220a. For example, the pattern board image 220a may be formed of squares each having a horizontal length of $L_3$ and a vertical length of $L_4$ forming a black or white box.

The reference height $H_1$ and the actual size of the pattern board 150 have been mapped to one or more reference images stored through the process of FIGS. 3A and 3B. Therefore, a conversion matrix may be performed using mapped information between the sire of the reference image, the reference height $H_1$, and the actual size of the pattern board 150, and values resulting from rotation and translation may be extracted.

The actual height $H_2$ of the ceiling 40 may be calculated by applying the conversion matrix to the bottom surface image 210a acquired through the process of FIGS. 4A and 4B. For example, the process of FIGS. 4A and 4B may be performed by a service man who mounts or installs the air conditioner or may be performed when a user sets or programs the air conditioner 1

Figure 5:
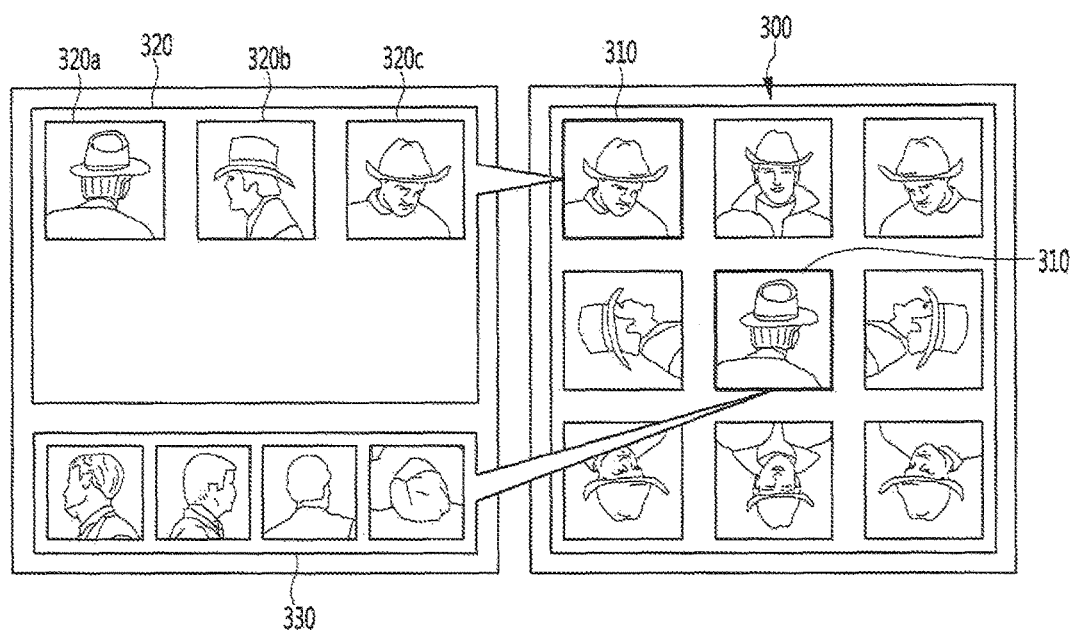
FIG. 5 is a diagram illustrating first image data stored in a memory according to an embodiment.
Figure 6:
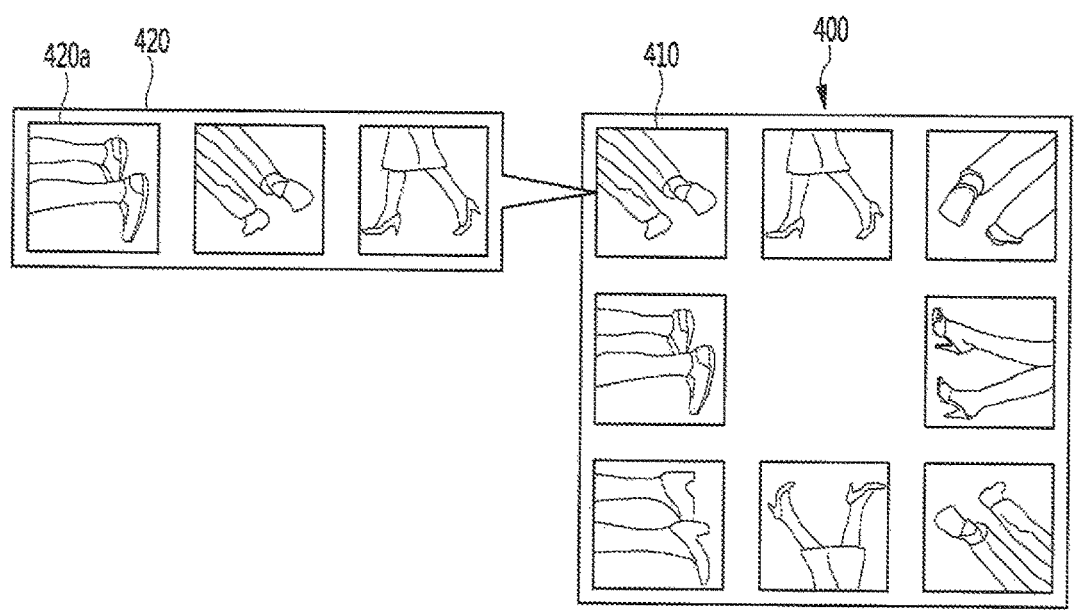
FIG. 6 is a diagram illustrating second image data stored in a memory according to an embodiment.
Figure 7:
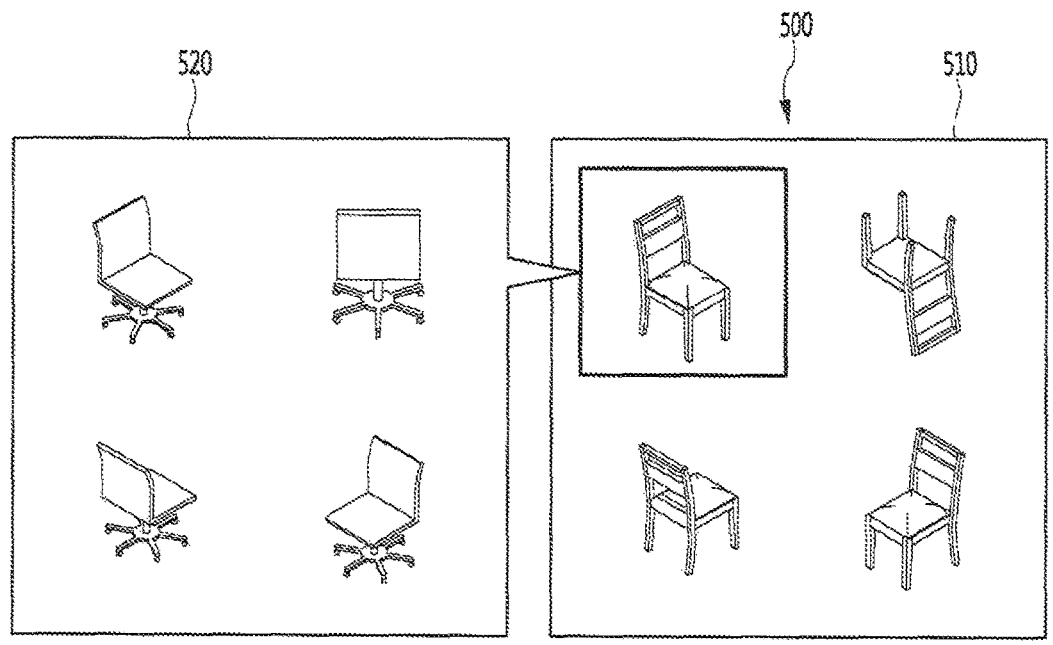
FIG. 7 is a diagram illustrating third image data stored in a memory according to an embodiment.

FIG. 5 is a diagram illustrating first image data stored in a memory according to an embodiment. FIG. 6 is a diagram illustrating second image data stored in a memory according to an embodiment. FIG. 7 is a diagram illustrating third image data stored in a memory according to an embodiment.

Referring to FIGS. 5 to 7, the memory 120 according to an embodiment may store a plurality of images capable of being matched with a specific object of the acquired image through the imaging device 100. First, referring to FIG. 5, the memory 120 may store first image data 300 about an upper half of a person (human body). More specifically, the first image data 300 may include main data 310 representing a top, view image of a specific person (human body), captured in various directions. For example, the various directions may include nine directions. The nine directions may include a left forward direction, a central forward direction, a right forward direction, a left downward direction, a straight downward direction, a right downward direction, a left backward direction, a central backward direction, and a right backward direction, with respect to the imaging device 100.

In addition, the first image data 300 may further include pieces of first sub-data 320, which may be matched with the main data 310 in the nine directions respectively while a direction in which a person looks is being changed. The first sub-data may include a plurality of pieces of pose data distinguished by a pose of a person. For example, the plurality of pose data may include first pose data 320a, second pose data 320b, and third pose data 320c, which are matched with the age data in the left forward direction of the nine directions.

The first pose data 320a may be an image representing a back pose of a person, who looks forward, in the left forward direction with respect to the imaging device 100. The second pose data 320b may be an image representing a first side pose of a person, who looks to the left, in the left forward direction with respect to the imaging device 100, and the third pose data 320c may be an image representing a second side pose of a person, who looks to the right, in the left forward direction with respect to the imaging device 100.

As described above, the pieces of first sub-data 320 may constitute image data at various viewpoints with respect to a shape of a specific person (human body) included in the main data 310. Therefore, there may be a high possibility that it is determined as a person with respect to the image of the upper half having various types of shapes.

The first image data 300 may further include second sub-data 330, which may be matched with a person having a different shape of human body, in each of the nine directions. For example, in FIG. 5, the second sub-data 330, matched with the image data in the straight downward direction of the nine directions, is illustrated.

More specifically, a shape of a person image included in the second sub-data 330 may be different from the shape of a person image included in the main data 310. In this case, the shape of the person image may include a gender, a hair length, and a clothing, for example.

As described above, the pieces of second sub-data 330 may constitute image data having a different shape from the shape of a specific person (human body) included in the main data 310. Therefore, there may be a high possibility that it is determined as a person with respect to the image of the upper half having various types of shapes.

Next, referring to FIG. 6, the memory 120 may store second image, data 400 about a lower half of a person (human body). More specifically, the second image data 400 may include main data 410 representing a lower half image of a specific person (human body), captured in various directions.

For example, the various directions may include eight directions. More specifically, the eight directions may include a left forward direction, a central forward direction, a right forward direction, a left downward direction, a right downward direction, a left backward direction, a central backward direction, and a right backward direction, with respect to the imaging device 100. Unlike the first image data 300, the reason why the straight downward direction is omitted is that there may be a limitation in acquiring an image in the straight downward direction in the case of the lower half.

Further, the second image data 400 ray further include pieces of sub-data 420, which may be matched with the main data 410 in the eight directions respectively while a direction in which a person looks is being changed. The sub-data 420 may include a plurality of pieces of pose data 420a which are matched in the eight directions.

The plurality of pieces of pose data 420a may represent main data located in a direction adjacent to the main data 410 in each of the directions. For example, in FIG. 6, there is illustrated a concept in which the plurality of pieces of pose data 420a include image data in the central forward direction and the left downward direction adjacent to image data in the left forward direction, along with the image data in the left forward direction.

As described above, the sub-data 420 may be provided in such a way that images similar to the shape of the lower half included in the main data 410 are stored as one category, thus enhancing a matching probability between an image acquired through the imaging device 100 and a previously-stored image.

Subsequently, referring to FIG. 7, the memory 120 may store third image data 500 about an obstacle. More specifically, the third image data 500 may include main data 510 representing a top view image of a specific obstacle, captured in various directions. For example, the various directions may include four directions. The four directions may include a left forward direction, a right forward direction, a left backward direction, and a right backward direction, with respect to the imaging device 100.

The third image data 500 may further include sub-data 520 related with an image of an obstacle having a similar shape with respect to the main data 510 in the four directions. For example, as illustrated in FIG. 7, an obstacle included in the main data 510 may have a shape of a "wooden chair" and an obstacle included in the sub-data 520 may have a shape of a "cushion hair". The image of the obstacle included in the sub-data 520 may include images in the four directions, that is, in a left forward direction, a right forward direction, a left backward direction, and a right backward direction.

Although the type of the obstacle is illustrated as being a "chair", the type of the obstacle is not limited thereto. The type of the obstacle may include a desk, a closet, other furniture, and an electronic product, for example. Image data of the obstacle at various viewpoints may be stored in the memory 120.

As described above, image information of various types of obstacles may be stored in the memory 120 and the stored image may be compared with an image acquired through the imaging device 100, thus increasing a probability that the image having a specific shape is matched with an obstacle. Further, information about a size of the obstacle (or height) may be also stored in the memory 120 based on a type, or shape, for example, of a general obstacle.

Figure 8:
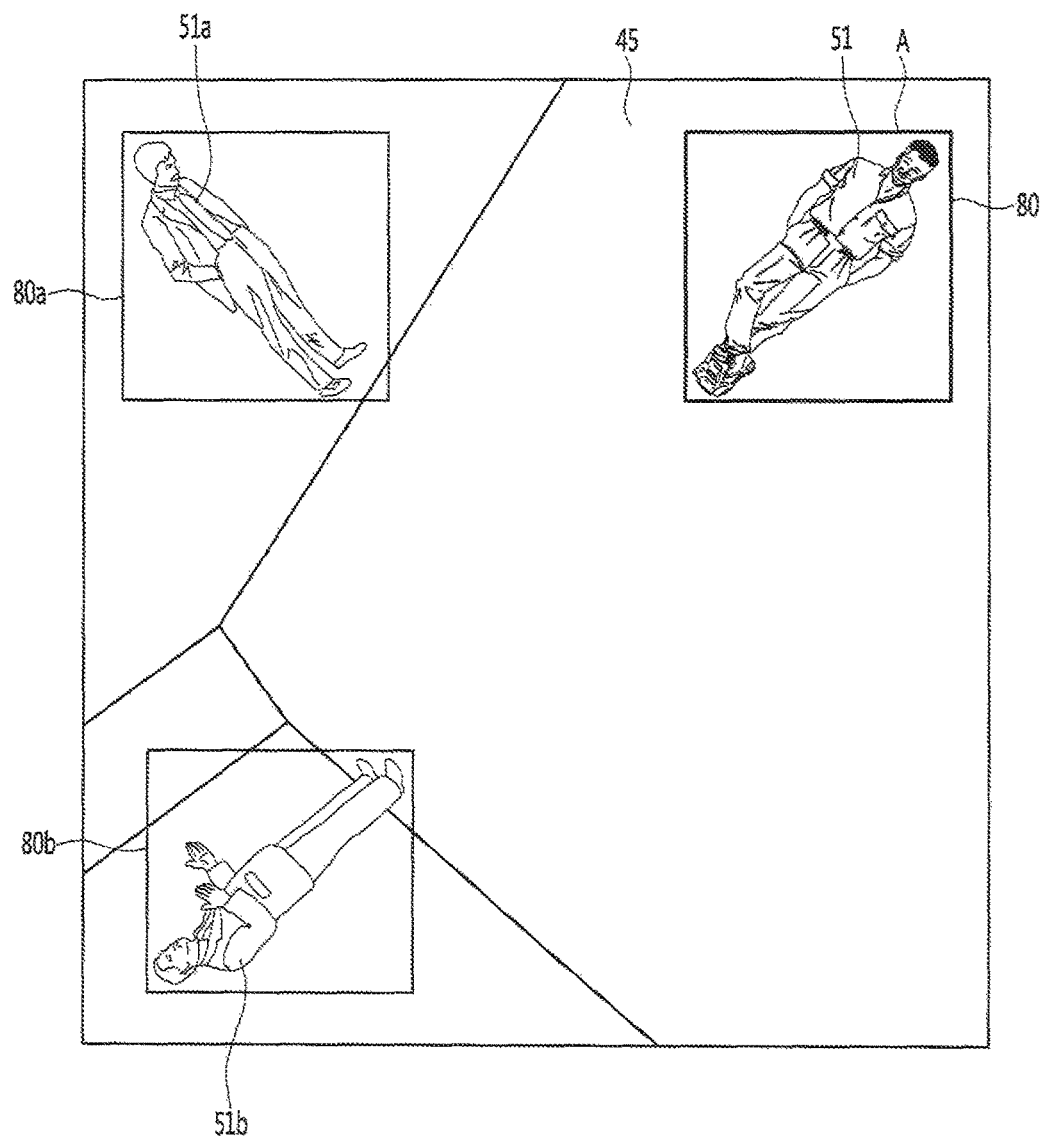
FIG. 8 is a diagram illustrating a case of acquiring an image of a person (human body) positioned in the indoor space through an imaging device.
Figure 9:
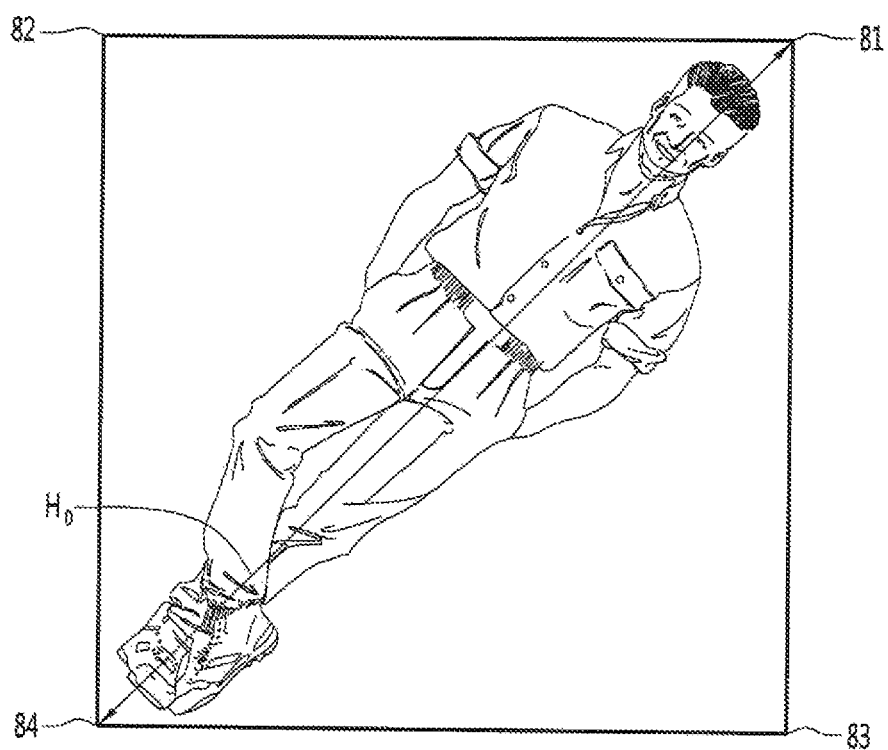
FIG. 9 is an enlarged diagram of "A" of FIG. 8, which illustrates a case of calculating a height from an image of a person (human body) acquired through an imaging device

FIG. 8 is a diagram illustrating a case of acquiring an image of a person (human body) positioned in the indoor space through an imaging device, according to an embodiment. FIG. 9 is an enlarged diagram of "A" of FIG. 8, which illustrates a case of calculating a height from the image of the person (human body) acquired through the imaging device.

FIG. 8 illustrates a case of acquiring an image of a predetermined object existing in the indoor space 30 through the imaging device 100 and determining that the image is a person (human body). More specifically, the image may include an image of a standing person 51 on the bottom surface 45. For example, the image of the person 51 may include a first image 51a and a second image 51b.

A frame 80 including the image of the person 51 may be generated. The frame 80 may be generated to surround the image sensed as a person. For example, the frame 80 may include a first frame 80a surrounding the first image 51a such that the first image 51a is included therein and a second frame 80b surrounding the second image 51b such that the second image 51b is included therein.

When the frame 80 is generated, a height of the person may be calculated from the image of the person 51. More specifically, referring to FIG. 9, the frame 80 may be defined to have a rectangular shape. For example, the frame 80 may be generated such that a direction from the head to the toe in the image of the person is placed in a diagonal direction.

The frame 80 may be defined by four points 81, 82, 83, and 84. The four points 81, 82, 83, and 84 may include a first point 81 corresponding to a head of the human body and defined as one corner of the frame, a second point 82 spaced apart from the first point 81 in a horizontal direction (in a left direction in FIG. 9) in which a toe is positioned and defined as another corner of the frame, a third point 83 spaced apart from the first point 81 in a vertical direction (in a downward direction in FIG. 9) and defined as another corner of the frame, and a fourth point 84 spaced apart from the first point 81 in a diagonal direction and defined as another corner of the frame.

On the other hand, two dimensional coordinates of the first image 51a and two dimensional coordinates of the second image 51b may be calculated. The coordinates may be used to calculate sizes of the first image 51a and the second image 51b, that is, the height of the person. That is, when the image is located far from the imaging device 100 in a lateral or the left or right direction, the size of the image relatively becomes larger, whereas, when the image is located closer to the imaging device 100 in the straight downward direction, the size of the image becomes relatively smaller.

The height of the person represented by the image may be calculated by using, as variables, a length $H_0$ of the image existing within the frame 80 in a diagonal direction, that is, a line extending from the first point 81 to the fourth point 84, and the coordinate values of the image. For example, when a point from which an imaginary line may be drawn straight downward from the imaging device 100 is set as a zero point, coordinates at which the image of the person is located may be calculated. When the coordinate values become larger, that is, a distance of the coordinate values from the zero point becomes longer, the length $H_0$ of the line increases. When the coordinate values become larger, that is, the distance of the coordinate values from the zero point becomes shorter, the length $H_0$ of the line decreases. When the length $H_0$ of the line is measured by considering the distance of the coordinate values as a proportional constant, the height of the person may be calculated.

On the other hand, when the image of the person is located straightly downward from the imaging device 100, the toe of the person in the image may not be displayed. In this case, a frame including both shoulders and the head of the upper half may be defined and a distance of a diagonal line may be measured. In addition, the distance of the coordinate values may be considered, thus calculating the height of the person. In this case, the distance of the coordinate values may be previously determined to be a very small constant value which is not zero.

When the position and height of the person are calculated, the driving of the indoor fan 170 and the discharge vane drive 180 may be contra led such that discharged air flow reaches the person. For example, in consideration of the height of the person, control may be performed such that the discharged air flow reaches the upper half of the person. When the air flow is discharged directly toward the upper half, the user may feel uncomfortable.

Figure 10:
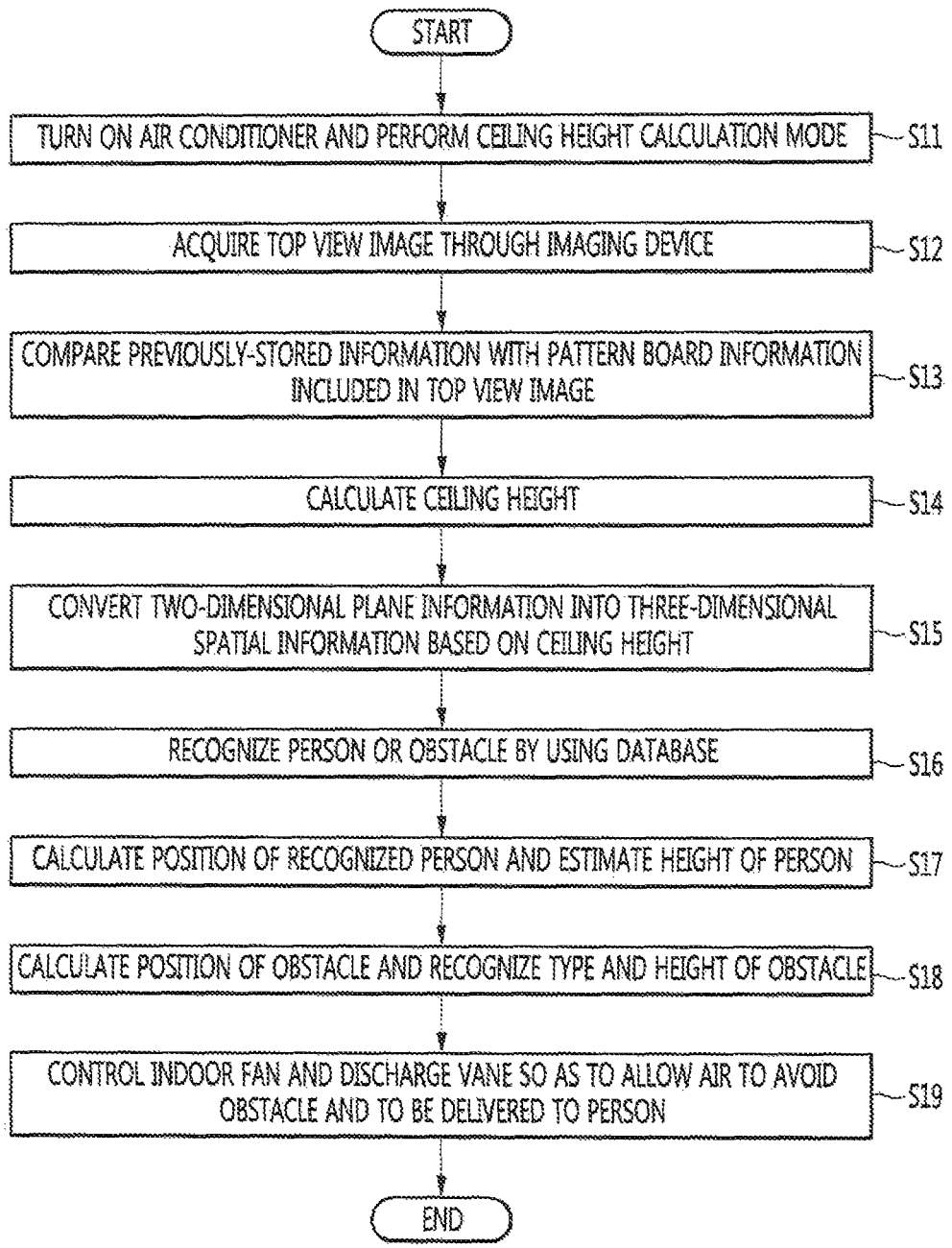
FIG. 10 is a flowchart of a method or controlling an air conditioner according to an embodiment.

FIG. 10 is a flowchart of a method for controlling an air conditioner according to an embodiment. Referring to FIG. 10, after the air conditioner 1 has been mounted, a power supply thereof may be turned on and a ceiling height calculation mode may be performed (S11). For example, the ceiling height calculation mode may be performed by manipulating a predetermined input device provided in or on the input 110. As described above, the input 110 may be provided in a remote control. Further, the ceiling height calculation mode may be performed by a service man who mounts or installs the air conditioner 1 or by a user in an initial setting or programming process.

When the ceiling height calculation mode is performed, the imaging device 100 may be driven to acquire a top view image for the indoor space 30 (S12). The acquired top view image may be compared with a reference image stored in the memory 120 (S13). More specifically, the memory 120 may store reference image information of the pattern board for the reference height $H_1$, that is position and size information of the reference image. The previously-stored reference image information may be compared with the position and size information of the top view image acquired in S12. As a comparison result, the ceiling height $H_2$ of the indoor space 30 may be calculated (S14).

Two dimensional plane information acquired through the imaging device 100 may be transformed into three dimensional spatial information by reflecting the calculated ceiling height $H_2$. That is, a camera calibration process may be performed (S15).

An image of a predetermined object, included in the acquired top view image, may be compared with a database stored in the memory 120, that is image data abut the shape of the upper half of a human body, image data about the shape of the lower half, and image data about an obstacle. As a comparison result, whether the image of the predetermined object is a person or an obstacle may be recognized (S18).

When it is recognized that the image of the predetermined object is a person (human body), a position of the recognized person may be calculated and a height of the person may be estimated. In regard to a method of estimating the height of the person, the content described with reference to FIGS. 8 and 9 are referred to (S17). When it is recognized that the image of the predetermined object is an obstacle, a position of the obstacle may be calculated and information about a type and height of the obstacle may be recognized. Such information may be previously stored in the memory 120 (S18).

According to the methods described above, calculation of a ceiling height, identification of a person (human body) and an obstacle, calculation of a position, and estimation of a height of the person may be executed, and calculation results may be used as control information for operation of the air conditioner 1. More specifically, the controller 250 may control the driving of the indoor fan 170 and the discharge vane drive 180 so as to allow air flow to avoid the obstacle and to be discharged toward the position of the person (human body).

For example, when it is recognized that the position of the person (human body) is spaced relatively far apart from the indoor device 20, it is possible to increase a number of rotations of the indoor fan 170. When it is recognized that the position of the person (human body) is relatively closely spaced to the indoor device 20, it is possible to decrease the number of rotations of the indoor fan 170 and drive the discharge vane 24 so as to allow the air flow to be directed toward the lower half of the person (S19).

Embodiments disclosed herein provide an air conditioner and a method for controlling an air conditioner, which can acquire an image of a user or an obstacle existing or disposed in an indoor space by a ceiling indoor unit or device. Also, embodiments disclosed herein provide an air conditioner and a method for controlling an air conditioner, which can calculate a ceiling height of an indoor space in which a ceiling indoor unit or device is mounted. Further, embodiments disclosed herein provide an air conditioner and a method for controlling an air conditioner, which can recognize indoor space information from an acquired image and control a direction or air volume of discharged air flow based on the recognized indoor space information.

Embodiment disclosed herein provide a control method for an air conditioner that may include acquiring a top view image for an indoor space by using an imaging device and calculating a height of a ceiling in which an indoor unit or device is mounted; determining whether an image is a human body or an obstacle, with respect to at least one image included in the top view image; and performing control to allow air flow to avoid the obstacle and be discharged toward the human body by controlling driving of an indoor fan or a discharge vane provided in the indoor unit. The calculating of the height of the ceiling may include comparing information about a previously-stored reference image for a reference height ($H_1$) with information about the acquired top view image. The information about the reference image and the information about the acquired top view image may include a position and a size of a pattern board individually, and an actual ceiling height ($H_2$) may be calculated with respect to the reference height by performing comparison of the pieces of information about the position and the size of the pattern board.

The calculating of the height of the ceiling may include performing camera calibration for performing conversion between three dimensional image coordinates of the indoor space and two dimensional image coordinates of the acquired top view image. The determining of whether the image is a human body or an obstacle may include matching image data stored in a memory unit or memory with at least one age included in the acquired top view image.

The image data stored in the memory unit may include image data of an upper half of the human body and image data of a lower half of the human body. The image data stored in the memory unit may include image data of the obstacle.

The control method may further include, when it is determined that at east one image included in the acquired top view image includes an image corresponding to the human body, estimating a height of a person based on the image corresponding to the human body. The estimating of the height of the person may include generating a frame including an image corresponding to the human body therein.

The frame may include four points defining a rectangle. The estimating of the height of the person may be performed based on a length of a diagonal line of the rectangle and position coordinates of the image corresponding to the human body.

Embodiments disclosed herein further provide an air conditioner that may include an indoor unit or device mounted in a ceiling; an indoor fan provided in the indoor unit; a discharge vane provided in the indoor unit to control a direction of discharged air fit) an imaging device mounted in the indoor unit or at one side of the indoor unit to acquire a top view image of an indoor space; a memory unit or memory configured to store reference image information which may be compared with the top view image acquired through the imaging device; and a control unit or controller configured to recognize an image corresponding to a person or an obstacle, based on the top view image acquired through the imaging device and the reference image information. The control unit may control driving of the indoor fan and the discharge vane so as to allow air flow to avoid the obstacle and to be discharged toward the person.

The reference image information may include information about a position and a size of a pattern board put on a bottom surface of the indoor space, and may be stored to be mapped to a reference height. The control unit may compare the position and the size of the pattern board included in the top view image, with the position and the size of the pattern board, included in the reference image, and calculate a height of the ceiling.

The memory unit may store first image data for a shape of an upper half of a human boy; second image data for a shape of a lower half of a human boy; and third image data for a shape of an obstacle. The first image data or the second image data may include main data representing an image of a human body located in various directions, and first sub-data in which a side or back pose is matched with respect to the main data while a person's viewpoint varies.

The first image data or the second image data may further include second sub-data in which an image of a human body of the main data is matched with an image of a human body with a different shape. The third image data may further include main data representing images in various directions with respect to a shape of one obstacle; and sub-data representing an image of another obstacle matched with the one obstacle.

The pattern board may include a chess board in which white boxes and black boxes are arranged alternately. The reference image information may be determined based on information about an input reference height and an image of the pattern board put on a bottom surface of the indoor space.

According to embodiments disclosed herein, an imaging device may be mounted in a ceiling type indoor unit or device or a ceiling and an image existing in an indoor space may be recognized as a top view image using the imaging device, thus acquiring indoor space information from the recognized image. Further, a ceiling type indoor unit or device may be mounted, a two dimensional image using a pattern board may be acquired in a predetermined operation mode, and a ceiling height may be calculated using information about the image. Thus, it is possible to facilitate appropriate control of the air conditioner according to the ceiling height.

Furthermore, the memory that stores accumulated information about an upper or lower half of a person (human body) may be provided, and an image acquired through the imaging device may be compared with an image stored in the memory to determine whether the acquired image corresponds to a person, thus allowing air flow to be discharged toward a position at which the person is located. Also, when the acquired image corresponds to a person, it is possible to estimate a height of the person based on a distance between two points implemented on the image, thus efficiently controlling the direction of discharged air flow.

The memory may store various image information about an obstacle capable of existing in an indoor space and an image acquired through the imaging device may be compared with an image stored in the memory to determine whether the acquired image corresponds to an obstacle, thus allowing air flow to be discharged so as to avoid the obstacle. Accordingly, it is possible to decrease a blind spot to which air flow hardly reaches in the indoor space.

According to the method as described above, it is possible to prevent generation of a blind spot for an air conditioner due to blocking of discharged air flow by an obstacle, and control an intensity or direction of the discharged air flow depending on a position and height of a human body.

Any reference in this specification to "one embodiment," "an embodiment," "example embodiment," etc, means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have, been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A method for controlling an air conditioner, the method comprising:

acquiring at least one top view image for an indoor space using an imaging device installed on a ceiling of the indoor space;

calculating a height of the ceiling using the at least one top view image;

determining whether an image is directed to a human body or an obstacle, with respect to at least one image included in the at least one top view image; and performing control of an indoor device of the air conditioner to allow air flow to avoid an obstacle and be discharged toward a human body by controlling driving of at least one of an indoor fan or at least one discharge vane provided in the indoor device in consideration of the calculated height of the ceiling, wherein:

the determining of whether an image is directed to a human body or an obstacle includes recognizing the human body in the at least one top view image by comparing the at least one top view image with first image data and second image data; and the performing control of the indoor device to allow air flow to be discharged toward a human body includes performing control of the indoor device such that the air flow is directed to the lower half of the human body when the human body is at a first predetermined position to the indoor device.

2. The method of claim 1, wherein the calculating of the height of the ceiling includes comparing information about a previously-stored reference image for a reference height with information about the at least one top view image.

3. The method of claim 2, wherein the information about the reference image and the information about the at least one top view image include a position and a size of a pattern board, respectively, and wherein an actual ceiling height is calculated with respect to the reference height by performing comparison of pieces of information about the position and the size of the pattern board.

4. The method of claim 1, wherein the calculating of the height of the ceiling includes performing camera calibration for performing conversion between three dimensional image coordinates of the indoor space and two dimensional image coordinates of the at least one top view image.

5. The method of claim 1, wherein the first image data and the second image data are stored in advance in a memory with the at least one image included in the at least one top view image, wherein the first image data defines an image of an upper half of a human body filmed from the imaging device located on the ceiling, and wherein the second image data defines an e of a lower half of the human body filmed from the imaging device located on the ceiling.

6. The method of claim 1, further including, when it is determined that at least one image included in the at least one top view image includes an image corresponding to a human body, estimating a height of a person based on the image corresponding to the human body.

7. The method of claim 6, wherein the estimating of the height of the person includes generating a frame including an image corresponding to a human body therein.

8. The method of claim 7, wherein the frame includes four points defining a rectangle.

9. The method of claim 8, wherein the estimating of the height of the person is performed based on a length of a diagonal line of the rectangle and position coordinates of the image corresponding to the human body.

10. The method of claim 1, further including performing control of the indoor device to increase a number of rotations of the indoor fan when the human body is at a second predetermined position from the indoor device, the second predetermined position being farther than the first predetermined position with respect to the indoor device.

11. The method of claim 1, further including performing control of the indoor device to decrease a number of rotations of the indoor fan when the human body is at the first determined position from the indoor device.

* * * * *